April 11, 1950 R. E. MEDFORD 2,503,882
METHOD OF JOINING HOLLOW MEMBERS
Filed Feb. 5, 1946
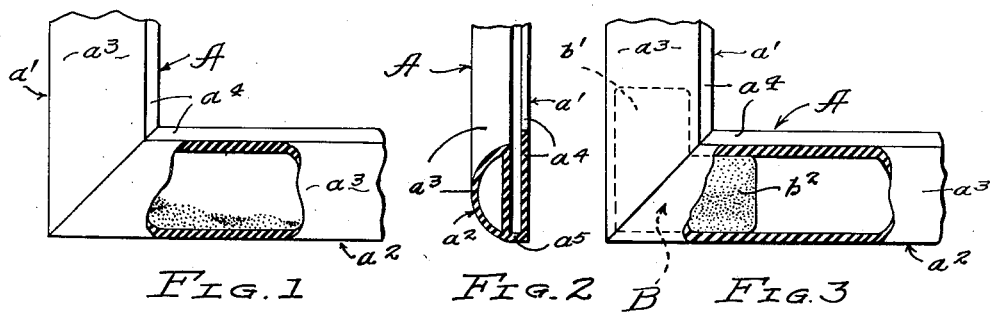
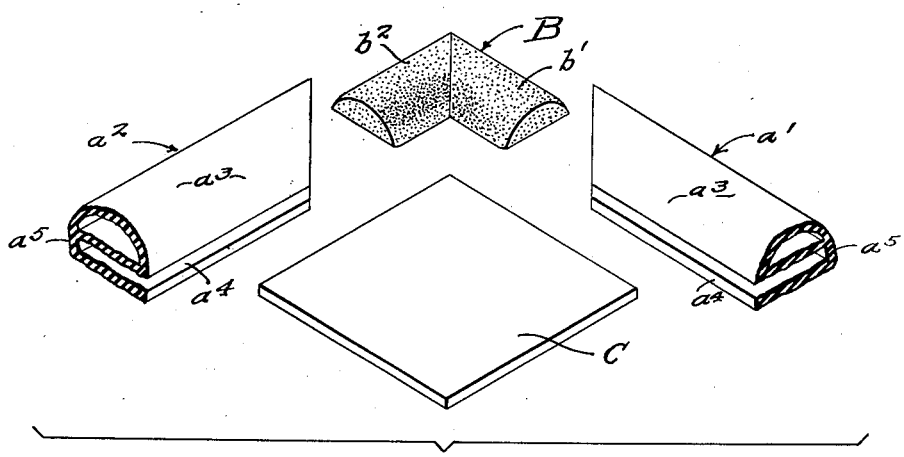
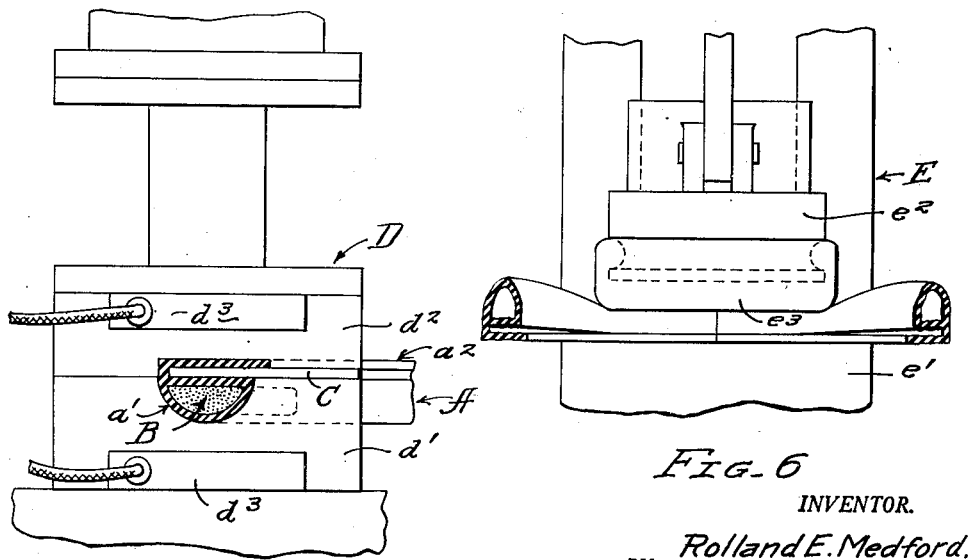
INVENTOR.
Rolland E. Medford.
BY Hull & West
ATTYS.

Patented Apr. 11, 1950

2,503,882

UNITED STATES PATENT OFFICE 2,503,882

METHOD OF JOINING HOLLOW MEMBERS

Rolland E. Medford, Middlefield, Ohio, assignor to The Johnson Rubber Company, Middlefield, Ohio, a corporation of Ohio Application February 5, 1946, Serial No. 645,663

5 Claims. (Cl. 154—83).

My invention resides in improvements in the method of producing a joint between hollow members made of rubber, synthetic rubber, plastics, or the like, the method being especially suited to the making of butt, angle or miter joints between members or sections of fabricated continuous hollow gaskets, as, for example, between the side and end members of gaskets of the kind used on refrigerator doors. Such gaskets consist of extruded members or sections of rubber, synthetic rubber, plastics, or other suitable materials, each having a hollow striking bead and a base flange to which the bead is integrally attached along one side.

It is the purpose of my invention to provide a very simple, efficient and economical method of producing joints between hollow members of rubber and the like, especially joints between the members or sections of gaskets of the kind above described, in which I employ reducible cores— i. e. friable cores, or cores composed wholly or partially of a soluble substance or compound, for supporting the joints during vulcanization and which are then disintegrated by the application of force to the exterior of the article or gasket, or entirely or partially dissolved by the injection of a suitable solvent into the interior of the article or gasket, the residue being allowed to permanently remain inside the latter.

In the accompanying drawing, wherein similar reference characters designate corresponding parts throughout the several views, Fig. 1 is a fragmentary elevational view of a refrigerator door gasket in the region of a corner joint, the front wall of the striking bead being cut away to show the granular material of a disintegrated friable core; Fig. 2 is a sectional detail through the gasket as though looking from the right of Fig. 1; Fig. 3 is a view, similar to Fig. 1, showing the core before it is crushed; Fig. 4 is an exploded perspective view including the core, adjacent ends of gasket sections or members, and a spacer used in the vulcanizing step; Fig. 5 is illustrative of the latter step, and Fig. 6, of the core crushing or disintegrating step of the method, when a friable core is employed.

The article or gasket, a fragment of which is shown in the drawings, is designated generally by the reference letter A, and it includes side and end members or sections $a'$ and $a^2$, respectively. Each member or section comprises a hollow striking bead $a^3$, a base flange $a^4$, and a wall $a^5$ by which the bead is integrally attached to said flange along one side.

B is a core, angular in form, the branches of which are designated $b'$ and $b^2$, said branches corresponding in cross sectional size and shape to the interior of the hollow striking beads $a^3$ of the gasket members or sections. The core is molded or otherwise formed from a suitable substance or composition. For example, it may be composed of granular material, such as core sand, and an appropriate binder. The substance or composition of the core as a whole may be soluble, or the binder only may be capable of being dissolved.

According to my improved method of forming the joint, the ends of the members or section $a'$ and $a^2$ that are to be joined together are cut to the required angle, as to an angle of 45° if the finished joint is to be one of 90°, and a suitable thermoplastic material or cement is applied to the end surfaces of said members or sections. The striking beads $a^3$ of said members or sections $a'$ and $a^2$ are then projected over the respective branches $b'$ and $b^2$ of the core B until the ends are in abutting relation.

A spacer C, of a thickness corresponding substantially to the width of the space between the base flange $a^4$ and the back wall of the striking bead $a^3$, is inserted into said space to retain the bead in properly spaced relation to the flange during the subsequent vulcanizing step.

In Fig. 5 is illustrated more or less schematically vulcanizing apparatus D, the same comprising a stationary die $d'$ and a movable die $d^2$, each equipped with an electric heater $d^3$. With the dies separated, the assembly above described, inverted from the position in which the parts are illustrated in Fig. 4, is laid in a cavity in the die $d'$, after which the die $d^2$ is depressed to the position shown in the drawing, said die having a channel-like cavity for the reception of the base flange $a^4$, and cut away to accommodate the spacer C. With the ends of the members or sections $a'$ and $a^2$ thus confined within the dies of the vulcanizing apparatus, and the striking head $a^3$ supported by the core B (which is tough enough to sustain the force imposed thereon by the dies during the vulcanizing operation), current is supplied to the heaters $d^3$ to energize the same and impart heat to the dies for effecting vulcanization of the joint.

After all joints have been vulcanized, the cores are disintegrated, or wholly or partially dissolved. When friable cores are employed, the joints are successively subjected to the core crushing apparatus illustrated in Fig. 6 and designated E. This apparatus includes an anvil $e'$ on which the portion of the article or gasket adjacent a joint is placed with the joint beneath a plunger $e^2$ that is reciprocated by suitable means (not shown). The plunger is desirably equipped with a rubber cushion $e^3$. As the plunger $e^2$ descends it crushes the friable core B, disintegrating it, the resultant granular material permanently remaining within the striking bead. The character and quantity of the material are such that its presence will do no harm, nor in any way interfere with the action of the gasket.

On the other hand, when cores are used that are composed in whole or in part of soluble material, a suitable solvent is injected into the interior of the striking bead, where it will attack and break down the cores. For the performance of this alternative step of the method, an instrument in the nature of a hypodermic needle may be employed.

Having thus described my invention, what I claim is:

1. The method of joining together the edges of hollow members of rubber, synthetic rubber, plastics, or the like which consists in permanently encasing within the members a friable core by projecting parts of the members adjacent said edges over portions of the core until said edges are in abutting relation, connecting said edges by thermoplastic means and the application of heat and limited pressure, and then crushing the core by imposing force upon said members in said region.

2. The method of joining together the ends of hollow gasket sections of rubber, synthetic rubber, plastics, or the like which consists in permanently encasing within the sections a friable core by projecting said ends over portions of the core until the edges defining said ends are in abutting relation, connecting said edges by thermoplastic means and the application of heat and limited pressure thereto, and then disintegrating the core by imposing the necessary force upon the exterior of said sections in the region of the core.

3. The method of producing a joint between sections of a hollow gasket of rubber, synthetic rubber, plastics, or the like, each section comprising a base flange and a hollow striking bead that overhangs said flange and is integrally connected thereto along one side, said method consisting of projecting the ends of the beads of adjacent sections over portions of a friable core until the edges that define said ends and the ends of the base flange are in abutting relation, inserting a support for the base flange between the latter and said bead, connecting said edges by a thermoplastic means and the application of heat and limited pressure thereto so as to permanently encase the friable core within the striking bead, and then in the order desired, withdrawing said support and disintegrating the core by imposing the necessary force upon the sections of the gasket in the region of the core.

4. The method of producing a joint between adjacent ends of adjoining sections of a hollow gasket of rubber, synthetic rubber, plastics, or the like, each section comprising a base flange and a hollow striking bead overhanging said flange in spaced relation thereto and integrally connected to the flange along one side, said method consisting in applying thermoplastic material to the edges which define said ends, projecting said ends over portions of a friable core until said edges are in abutting relation, inserting a spacer between the base flange and striking bead throughout the region of the joint, placing the assembly of the foregoing elements in a mold and vulcanizing the joint by the application of heat and limited pressure thereto through the medium of said mold, removing the assembly from the mold, withdrawing said spacer, and subjecting the joint to the action of pressure means for the purpose of disintegrating the core.

5. The method of producing an angle joint between sections of a hollow gasket of rubber, synthetic rubber, plastics, or the like which consists in cutting the ends of said sections to the required angle, projecting said ends over the branches of an angle core of friable material until the edges that define said ends are in abutting relation, connecting said edges together by thermoplastic means and the application of heat and limited pressure thereto so as to permanently encase the friable core within said sections, and then disintegrating the core by imposing the necessary force upon said sections in the region of the core.

ROLLAND E. MEDFORD.

REFERENCES CITED

The following references are of record in the file of this patent:

UNITED STATES PATENTS

| Number | Name | Date |
| --- | --- | --- |
| 519,438 | Smith | May 8, 1894 |
| 528,056 | Woodward | Oct. 23, 1894 |
| 2,278,756 | Wright | Apr. 7, 1942 |